United States Patent
Aldridge et al.

(10) Patent No.: US 7,459,799 B2
(45) Date of Patent: Dec. 2, 2008

(54) DOMESTIC COMBINED HEAT AND POWER UNIT

(75) Inventors: Wayne Kenneth Aldridge, Granby (GB); David Anthony Clark, Huntington (GB); George McChesney Francis, Solihull (GB); Heather Allderidge, Derby (GB); Graham Richard Roberts, Hatton (GB)

(73) Assignee: Microgen Energy Limited, Reading (GB)

( * ) Notice: Subject to any disclaimer, the term of this patent is extended or adjusted under 35 U.S.C. 154(b) by 0 days.

(21) Appl. No.: 10/497,600

(22) PCT Filed: Dec. 18, 2002

(86) PCT No.: PCT/GB02/05774

§ 371 (c)(1),
(2), (4) Date: Jun. 3, 2004

(87) PCT Pub. No.: WO03/076857

PCT Pub. Date: Sep. 18, 2003

(65) Prior Publication Data

US 2005/0052029 A1    Mar. 10, 2005

(30) Foreign Application Priority Data

Dec. 20, 2001   (GB) ................................. 0130530.9

(51) Int. Cl.
*B60L 1/02* (2006.01)
*F01K 15/00* (2006.01)
*F01K 17/02* (2006.01)
*F02C 6/00* (2006.01)
*F02C 6/18* (2006.01)
*F02N 11/06* (2006.01)
*H02P 9/04* (2006.01)
*F03D 9/00* (2006.01)

(52) U.S. Cl. ............................. 290/2; 290/40 R; 290/44
(58) Field of Classification Search ..................... 290/2, 290/40 R, 44
See application file for complete search history.

(56) References Cited

U.S. PATENT DOCUMENTS 2,953,691 A * 9/1960 Rapp .............................. 290/2

(Continued)

FOREIGN PATENT DOCUMENTS

DE       4102636       8/1991

(Continued)

OTHER PUBLICATIONS

Dann et al "Microgen-Cogeneration for the home," at the International Gas Research Conference, San Diego, 1998.

(Continued)

*Primary Examiner*—Nicholas Ponomarenko
*Assistant Examiner*—Pedro J Cuevas
(74) *Attorney, Agent, or Firm*—Ballard Spahr Andrews & Ingersoll, LLP (57) ABSTRACT

A domestic combined heat and power (dchp) unit includes a Stirling engine 1 to provide heat for a domestic dwelling along with a source of electrical power. Under normal operation, the dchp is supplied with power from the national grid. When there is an interruption in the mains power from the grid, the dchp switches into a grid independent mode wherein power is generated by the dchp and is supplied to a controller 26 and to a water pump so as to maintain integrity of heat supply to the dwelling; the remaining power after that is supplied to selected domestic electrically powered equipment such as lights or television sets. The invention also discloses methods for black start of the dchp during a mains power loss, and also modification of the operating voltage on start up of electrical equipment during a power loss, to prevent the Stirling engine stalling.

16 Claims, 4 Drawing Sheets

U.S. PATENT DOCUMENTS

| | | | | |
|---|---|---|---|---|
| 3,424,916 A * | 1/1969 | Fenley | 290/40 R |
| 3,898,842 A * | 8/1975 | Luongo | 60/653 |
| 3,944,837 A * | 3/1976 | Meyers et al. | 290/40 R |
| 3,970,861 A * | 7/1976 | McCollum | 307/35 |
| 4,013,877 A * | 3/1977 | Uram et al. | 700/6 |
| 4,031,404 A * | 6/1977 | Martz et al. | 290/40 R |
| 4,047,005 A * | 9/1977 | Heiser et al. | 700/288 |
| 4,065,055 A * | 12/1977 | De Cosimo | 237/12.1 |
| 4,075,699 A * | 2/1978 | Schneider et al. | 700/291 |
| 4,150,300 A * | 4/1979 | Van Winkle | 290/2 |
| 4,174,517 A * | 11/1979 | Mandel | 340/310.12 |
| 4,201,924 A * | 5/1980 | Uram | 290/40 R |
| 4,275,311 A * | 6/1981 | Agazzone et al. | 290/2 |
| 4,302,750 A * | 11/1981 | Wadhwani et al. | 340/870.02 |
| 4,308,463 A * | 12/1981 | Giras et al. | 290/40 R |
| 4,324,987 A * | 4/1982 | Sullivan et al. | 307/35 |
| 4,336,462 A * | 6/1982 | Hedges et al. | 307/35 |
| 4,503,337 A * | 3/1985 | H/a/ fner et al. | 290/4 D |
| 4,510,756 A * | 4/1985 | Hise et al. | 237/12.1 |
| 4,515,554 A * | 5/1985 | Sirand | 431/78 |
| 4,572,961 A * | 2/1986 | Borger | 290/4 R |
| 4,613,760 A * | 9/1986 | Law | 290/1 C |
| 4,657,290 A * | 4/1987 | Linden | 290/2 |
| 4,667,133 A * | 5/1987 | Nilssen | 315/312 |
| 4,686,375 A * | 8/1987 | Gottfried | 290/2 |
| 4,694,192 A * | 9/1987 | Payne et al. | 307/39 |
| 4,752,697 A * | 6/1988 | Lyons et al. | 290/2 |
| 4,802,100 A * | 1/1989 | Aasen et al. | 700/288 |
| 4,847,781 A * | 7/1989 | Brown et al. | 700/296 |
| 4,847,782 A * | 7/1989 | Brown et al. | 700/296 |
| 4,855,922 A * | 8/1989 | Huddleston et al. | 700/295 |
| 4,873,840 A * | 10/1989 | Gilliusson | 62/238.6 |
| 4,899,129 A * | 2/1990 | MacFadyen et al. | 340/310.11 |
| 4,899,217 A * | 2/1990 | MacFadyen et al. | 725/80 |
| 5,025,985 A * | 6/1991 | Enander | 237/2 A |
| 5,067,652 A * | 11/1991 | Enander | 237/81 |
| 5,086,385 A * | 2/1992 | Launey et al. | 700/83 |
| 5,185,536 A * | 2/1993 | Johnson et al. | 307/66 |
| 5,218,552 A * | 6/1993 | Stirk et al. | 700/286 |
| 5,237,208 A * | 8/1993 | Tominaga et al. | 307/66 |
| 5,323,307 A * | 6/1994 | Wolf et al. | 700/22 |
| 5,347,167 A * | 9/1994 | Singh | 307/125 |
| 5,436,510 A * | 7/1995 | Gilbert | 307/38 |
| 5,532,525 A | 7/1996 | Kaiser et al. | 307/64 |
| 5,536,976 A * | 7/1996 | Churchill | 307/11 |
| 5,572,438 A * | 11/1996 | Ehlers et al. | 700/295 |
| 5,684,710 A * | 11/1997 | Ehlers et al. | 700/293 |
| 5,696,695 A * | 12/1997 | Ehlers et al. | 700/286 |
| 5,747,909 A * | 5/1998 | Syverson et al. | 310/156.56 |
| 5,805,856 A * | 9/1998 | Hanson | 392/465 |
| 5,905,442 A * | 5/1999 | Mosebrook et al. | 340/3.7 |
| 5,918,805 A * | 7/1999 | Guyer | 237/8 A |
| 6,018,449 A * | 1/2000 | Nelson et al. | 361/66 |
| 6,053,418 A * | 4/2000 | Guyer | 237/12.1 |
| 6,111,735 A * | 8/2000 | Nelson et al. | 361/64 |
| 6,134,124 A * | 10/2000 | Jungreis et al. | 363/34 |
| 6,192,687 B1 * | 2/2001 | Pinkerton et al. | 60/646 |
| 6,252,310 B1 * | 6/2001 | Wilhelm | 307/11 |
| 6,332,580 B1 * | 12/2001 | Enander et al. | 237/2 A |
| 6,347,027 B1 * | 2/2002 | Nelson et al. | 361/64 |
| 6,362,540 B1 * | 3/2002 | Hill | 307/52 |
| 6,463,738 B1 * | 10/2002 | Pinkerton et al. | 60/646 |
| 6,525,431 B1 * | 2/2003 | Clucas et al. | 290/2 |
| 6,536,207 B1 * | 3/2003 | Kamen et al. | 60/39.6 |
| 6,557,774 B1 * | 5/2003 | Krueger | 237/66 |
| 6,572,026 B2 * | 6/2003 | Enander et al. | 237/12.3 B |
| 6,583,521 B1 * | 6/2003 | Lagod et al. | 307/70 |
| 6,587,739 B1 * | 7/2003 | Abrams et al. | 700/83 |
| 6,588,419 B1 * | 7/2003 | Buezis et al. | 126/500 |
| 6,697,240 B2 * | 2/2004 | Nelson et al. | 361/64 |
| 6,598,397 B2 * | 5/2004 | Hanna et al. | 60/651 |
| 6,732,940 B2 * | 5/2004 | Enander et al. | 237/2 A |
| 6,764,785 B2 * | 7/2004 | Colborn et al. | 429/23 |
| 6,788,884 B2 * | 9/2004 | Reichelt | 392/307 |
| 6,828,695 B1 * | 12/2004 | Hansen | 307/31 |
| 6,832,135 B2 * | 12/2004 | Ying | 700/295 |
| 6,838,781 B2 * | 1/2005 | van de Loo | 290/40 B |
| 6,842,689 B2 * | 1/2005 | Andres et al. | 701/110 |
| 6,861,956 B2 * | 3/2005 | Ying | 340/825.69 |
| 6,938,828 B2 * | 9/2005 | Waalders et al. | 237/70 |
| 6,966,185 B2 * | 11/2005 | Shimada et al. | 60/698 |
| 7,109,597 B1 * | 9/2006 | Bose | 290/43 |
| 7,181,291 B2 * | 2/2007 | Boldt et al. | 700/17 |
| 7,196,433 B2 * | 3/2007 | Yang | 307/35 |
| 7,239,034 B2 * | 7/2007 | Gehret, Jr. | 290/40 B |
| 7,245,032 B2 * | 7/2007 | Willets et al. | 290/1 A |
| 7,256,704 B2 * | 8/2007 | Yoon et al. | 340/825 |
| 7,260,604 B2 * | 8/2007 | Kuki | 709/205 |
| 7,260,608 B2 * | 8/2007 | Kuki | 709/206 |
| 7,299,638 B2 * | 11/2007 | MacKay | 60/784 |
| 7,329,959 B2 * | 2/2008 | Kim et al. | 290/2 |
| 2001/0010032 A1 * | 7/2001 | Ehlers et al. | 702/62 |
| 2002/0011923 A1 * | 1/2002 | Cunningham et al. | 340/310.01 |
| 2002/0064010 A1 * | 5/2002 | Nelson et al. | 361/64 |
| 2002/0084655 A1 * | 7/2002 | Lof et al. | 290/44 |
| 2002/0087234 A1 * | 7/2002 | Lof et al. | 700/286 |
| 2002/0171379 A1 * | 11/2002 | Adamson | 315/312 |
| 2003/0006613 A1 * | 1/2003 | Lof et al. | 290/44 |
| 2003/0011486 A1 * | 1/2003 | Ying | 340/825.69 |
| 2003/0020333 A1 * | 1/2003 | Ying | 307/38 |
| 2003/0035984 A1 * | 2/2003 | Colborn | 429/23 |
| 2003/0050737 A1 * | 3/2003 | Osann, Jr. | 700/276 |
| 2003/0077493 A1 * | 4/2003 | Colborn et al. | 429/23 |
| 2004/0027003 A1 * | 2/2004 | Yang | 307/39 |
| 2004/0230377 A1 * | 11/2004 | Ghosh et al. | 702/3 |
| 2005/0006954 A1 * | 1/2005 | Bowman et al. | 307/9.1 |
| 2005/0127680 A1 * | 6/2005 | Lof et al. | 290/44 |
| 2005/0207081 A1 * | 9/2005 | Ying | 361/105 |
| 2005/0229838 A1 * | 10/2005 | Lyons | 117/11 |
| 2005/0251296 A1 * | 11/2005 | Tracy et al. | 700/292 |
| 2006/0049694 A1 * | 3/2006 | Kates | 307/132 E |
| 2006/0052906 A1 * | 3/2006 | Kates | 700/295 |
| 2006/0064205 A1 * | 3/2006 | Ying | 700/286 |
| 2006/0072262 A1 * | 4/2006 | Paik et al. | 361/62 |
| 2007/0260904 A1 * | 11/2007 | Camagna et al. | 713/310 |

FOREIGN PATENT DOCUMENTS

| | | |
|---|---|---|
| DE | 29706869 U1 | 1/1998 |
| EP | 0 298 164 | 1/1989 |
| EP | 0298164 A1 | 7/1989 |
| EP | 0 445 510 | 9/1991 |
| EP | 0445510 | 9/1991 |
| FR | 2 745 127 | 8/1997 |
| JP | 4308432 | 10/1992 |
| JP | 2001-045681 | 2/2001 |
| WO | WO 99/40310 | 8/1999 |
| WO | WO 00/74202 | 5/2000 |
| WO | WO 01 65100 | 9/2001 |
| WO | WO 01 69078 | 9/2001 |
| WO | WO 02/061911 A1 | 8/2002 |

OTHER PUBLICATIONS

Patent Abstracts of Japan, vol. 016, No. 112 (E-1180) dated Mar. 19, 1992 & No. JP03284134A (Toshiba Corp.) Abstract dated Dec. 31, 1991.

Exhibit A: Canadian Application No. 2,468,459, Jan. 2006.

Notice of Reasons for Rejection for Japanese Patent Application No. 2003-575037 date mailed Nov. 20, 2007 (4 Pages); (Japanese and English Translations).

Office Action for Canadian Patent No. 2,468,459 dated Jan. 21, 2008.

* cited by examiner

DOMESTIC COMBINED HEAT AND POWER UNIT

CROSS REFERENCE TO RELATED APPLICATIONS

The present application claims priority to Great Britain Application No. 0130530.9, filed Dec. 20, 2001, which application is incorporated herein fully by this reference.

The present invention relates to a domestic combined heat and power unit.

BACKGROUND OF THE INVENTION

The supply of electricity to domestic premises cannot always be guaranteed, and can fail due to a variety of external conditions. Domestic heating appliances generally require an electrical power supply, even where gas is the primary fuel, to power control circuitry, igniters, etc. A mains power failure therefore leaves the dwelling without its main source of heat, as well as lighting, etc. In the event of such a failure a great deal of discomfort is generally suffered by the consumer, and where the remote, very old or very young are concerned this can be a far more serious matter.

Arrangements for a back-up generating facility for domestic premises generally consist of engine-driven generators that need to be connected into the isolated circuit after the failure has occurred. These then provide power to the domestic circuit until the network supply is restored. The generator then needs to be turned off, disconnected and the mains supply reconnected. This arrangement provides back-up power but has disadvantages in generator storage and/or movement into position when required, alternative fuel storage for the generator, regular maintenance to ensure reliability, and the need for safe switching. Such a facility cannot be employed in an urban dwelling where no space, such as a garage, is available to house the generator.

Domestic heating systems that incorporate an internal power supply have been developed, such as in DE 29706869, where a back-up storage battery can provide power to the heating system for a limited time. A prolonged power cut would still however result in a loss of heat.

Domestic photo-voltaic systems exist that can provide a back-up electrical supply, but these are dependent on weather conditions and require daylight to generate. Wind-power too depends on external conditions, and cannot be relied upon for emergency power. Fuel cells could provide a potential back-up power supply, as in JP 4308432, where solar or fuel cells are used to provide back-up power, but only feed a DC system. The back-up is external to any piece of equipment and not specific to a heating system.

Recently, the present assignee has proposed a domestic combined heat and power (dchp) unit comprising a linear free piston) Stirling engine (LFPSE). In "Microgen—Cogeneration for the home", by Dann et al, at the International Gas Research Conference, San Diego, 1998, a review of the perceived requirements of a microcogeneration system and an introduction to the principles underlying the Stirling engine dchp is provided. As this paper indicates, the provision of standby power when power cuts occur is a desirable feature of such a dchp. The paper also indicates, without detailed explanation, that such provision presents implications.

The present invention is concerned in particular, but not exclusively, with addressing the implications of providing standby power from a dchp.

SUMMARY OF THE INVENTION

According to the present invention there is provided a domestic power system to provide the heat and electrical power requirements in a domestic dwelling, the system comprising a connection to a mains power supply which satisfies at least part of the domestic electrical power requirement during normal operating conditions; a domestic combined heat and power unit with a combustible fuel supply and which produces electrical power output and heat output which satisfies at least a part of the domestic heat requirement, the unit being operable in the absence of the mains power supply; means for detecting interruption of the mains power supply; and means for automatically connecting the electrical power output from the domestic combined heat and power unit, in the absence of mains power, to selected electricity consuming apparatus with a lower electrical power demand than the total domestic electrical power requirement.

The dchp unit provides at least part of the heat and electrical power requirement during normal operation, when mains power is present, by consuming fuel from a combustible fuel supply. When the mains power is interrupted, the same unit and combustible fuel supply are then used to generate electricity to power electricity consuming apparatus. The dchp will have a maximum power output that is, typically, insufficient to provide enough power to satisfy a usual total domestic demand in the latter case. In accordance with the invention, therefore, the electricity generated is used as a priority to power the operating systems of the dchp unit, to continue to produce heat output. However, it is envisaged that the level of electricity provided by the dchp unit during mains interruption will also be sufficient to allow selected other electrically powered apparatus, such as some lighting, and essential electrical appliances to provide a degree of utility to the user. In order to prevent an excess of power being drawn from the dchp unit, however, (during a power cut for example), leading to stalling of the Stirling engine, the present invention provides for some, but not all, of the power required during the presence of mains power to be provided for powering of lights or electrical sockets even during a power cut. In one preferred embodiment, only certain of the household sockets may be provided with power during an interruption of the mains supply. Alternatively, the voltage supplied to the sockets may be reduced for a given current demand, again so as to limit the total electrical power being drawn from the dchp. As the back-up power generation is not powered by a battery, it can go on producing power indefinitely while the supply of combustible fuel is available.

When the system is operating without mains power, such that the only electrical power is supplied by the dchp unit, it is possible for a consumer to demand an excessive power load which may damage the dchp unit. It is possible simply to provide a fuse to disconnect power to the selected electricity consuming apparatus if an excessive load is demanded. However, preferably, the system further comprises means to detect the power load demanded by the selected electricity consuming apparatus, and means to reduce the peak voltage supplied to the selected apparatus if the demanded power exceeds a threshold value. With this approach, the consumer is alerted to the fact that he is attempting to draw excessive power by a noticeable worsening performance of his electrical equipment (for example a dimming of the lights). He is then able to take action to reduce his power consumption. If no such action is taken, the system also preferably comprises means to disconnect the selected electricity consuming apparatus if the demanded power exceeds a threshold value for a predetermined time period.

The primary intention is to power the dchp unit using the domestic gas supply as this is the most commonly provided source of combustible fuel. However, other combustible gases such as LPG, LNG, or biogas, or a liquid fuel may also be used. In remote dwellings having a finite liquid fuel supply which is periodically replenished, the capacity for emergency power generation is admittedly limited. However, this capacity still vastly exceeds the capability of any commercially available battery. Also, in such circumstances, the present invention is still preferable to having a separate generator as the expense of such a generator and the inconvenience of having to start the generator manually are avoided.

The current preference is to use a Stirling engine as a domestic combined heat and power unit. The Stirling engine is preferably a linear free piston Stirling engine. This offers various advantages. For example, it is a sealed unit which requires little maintenance and operates synchronously to provide a stable power output.

The selected electricity consuming apparatus may be provided as entirely separate components from the main electrical circuits in the dwelling (e.g. an emergency lighting circuit). However, this involves the duplication of wiring and equipment. Alternatively, the selected electricity consuming apparatus may be those apparatus provided on one ring main in a dwelling with a number of such ring mains. However, preferably, the system is provided with means to selectively disconnect various electricity consuming apparatus in the absence of mains power.

If the means for detecting interruption of the mains power supply is also able to detect when the main voltage or frequency of the mains power supply are outside acceptable levels a further mode of operation is possible. This allows the system to disconnect certain equipment from the mains power supply when the mains is not of a suitable quality, and supply this equipment instead from the dchp unit. In this way, sensitive equipment can be protected, while less sensitive equipment is still supplied from the mains.

In the normal operation of a dchp unit, at times of high heat demand and low electrical power demand, the unit can have the capability to export excess electrical power to the grid. When it is disconnected from the grid, this is no longer possible. The system is therefore preferably provided with an electrical sink to consume excess electricity. This electrical sink is preferably in the form of a water cooled resistor. The excess electricity is thus converted to heat, which can be usefully used as this is inherently a mode of operation with high heat demand.

Conversely, if the electrical power demand is high, but the heat demand is low, under normal operating conditions, the unit would simply satisfy this electrical demand from the grid, while operating the dchp unit to match the heat requirement. In grid independent operation, this is not possible. Therefore, a heat sink is preferably provided. This is preferably in the form of a supplementary fan which is able to dissipate heat output from the dchp unit.

The nature of the operation of the dchp unit is such that it will spend a proportion of its time with the engine/generator shut down. If the mains supply is lost under such circumstances, it is advantageous to still be able to start the dchp unit to allow heat and emergency power to be supplied. Therefore preferably, the domestic combined heat and power unit comprises a Stirling engine comprising a burner to input heat energy into the engine head to drive a reciprocating member, the reciprocating member producing electrical output via an alternator; and a start-up system including control means for controlling the start-up of the unit, an ignitor to ignite the burner, a pulse generator to supply an electrical pulse to the generator to set the reciprocating member in motion when the control means determines that the engine head has reached a threshold temperature, and a local limited supply of electrical power to power the control means, ignitor and pulse generator during the start-up operation.

This unit forms a further aspect of the present invention which may be used in conjunction with or independent of the first aspect of the present invention. In particular, in accordance with a further aspect of the present invention, there is provided a domestic combined heat and power unit comprising a Stirling engine comprising a burner to input heat energy into the engine head to drive a reciprocating member, the reciprocating member producing electrical output via an alternator; and a start-up system including control means for controlling the start-up of the unit, an ignitor to ignite the burner, a pulse generator to supply an electrical pulse to the generator to set the reciprocating member in motion when the control means determines that the engine head has reached a threshold temperature, and a local limited supply of electrical power to power the control means, ignitor and pulse generator during the start-up operation.

The limited local supply is preferably a d.c. power supply such as a battery, but may, for example, also be one or more capacitors. This supply is only required to provide power to the control means, ignitor and pulse generator. It is therefore entirely different from existing applications which require the battery to provide all of the back-up power. The recharging of the battery can be immediately started once the Stirling engine is running.

In accordance with still a further aspect of the present invention, there is provided a domestic power system to provide the heat and electrical power requirements in a domestic dwelling, the system comprising a connection to a mains power supply which satisfies at least part of the domestic electrical power requirement during normal operating conditions; a domestic combined heat and power unit with a combustible fuel supply and which produces electrical power output with a normal operating voltage substantially that of the mains power supply, and heat output which satisfies at least a part of the domestic heat requirement, the unit being operable in the absence of the mains power supply; a detector for detecting interruption of the mains power supply; a switch to switch the electrical power output of the domestic combined heat and power unit so as to supply at least a part of the domestic power requirement when the absence of mains power has been detected by the said detector; and a unit power limiter arranged, during the period when the unit is supplying the domestic power requirement, to control the instantaneous peak voltage of the output of the unit to a value less than the said normal operating voltage thereof, when the current demanded by the domestic power requirement would exceed the maximum current that could be drawn from the unit at the normal operating voltage.

BRIEF DESCRIPTION OF THE DRAWINGS

Examples of a system and unit in accordance with the present invention will now be described with reference to the accompanying drawings in which.

DETAILED DESCRIPTION OF THE PREFERRED EMBODIMENT

Figure 1:
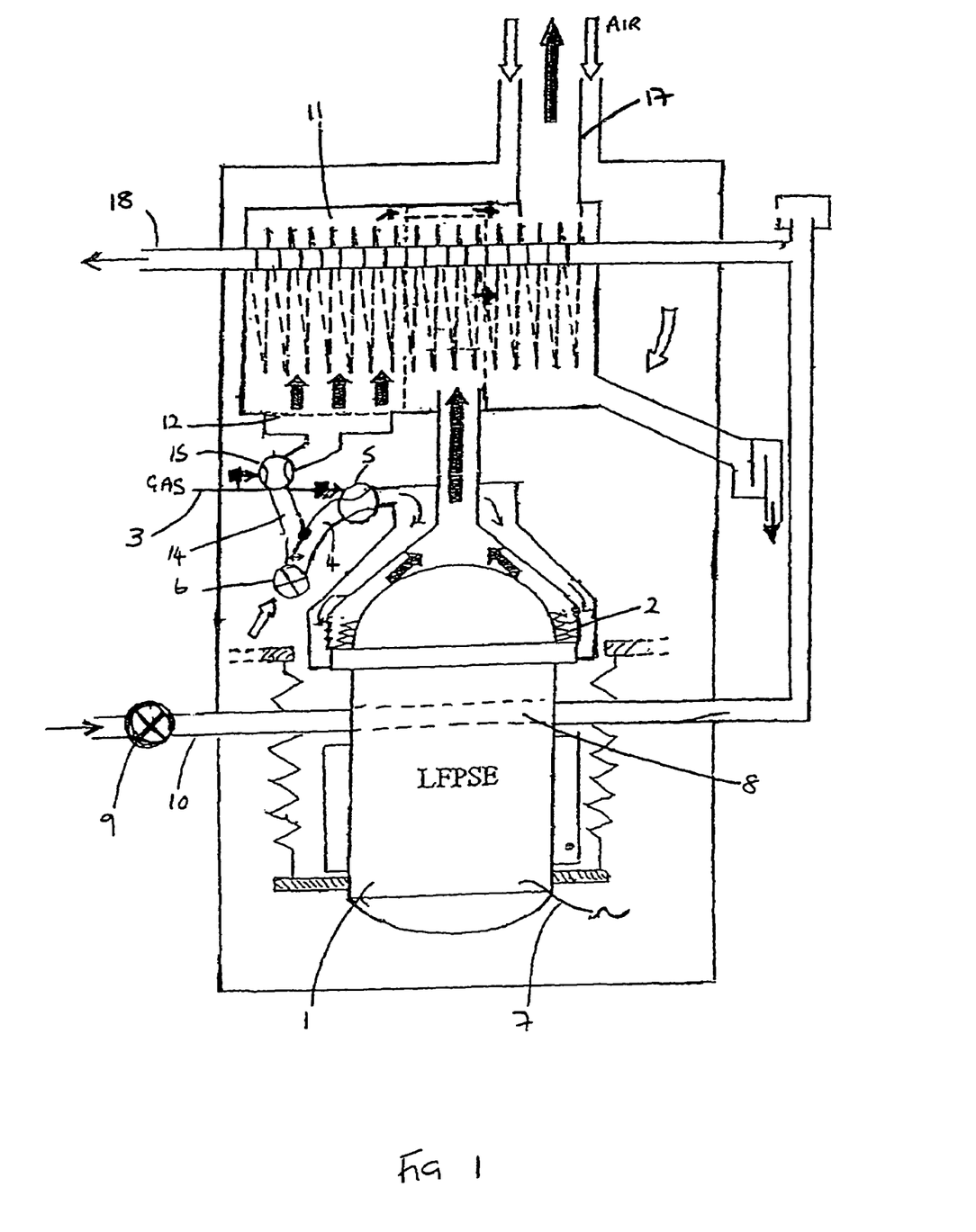
FIG. 1 is a schematic view of a Stirling engine system showing the various inputs and outputs to the system.

The dchp system is based around a Stirling engine 1 as shown in FIG. 1. The engine is preferably a linear free piston Stirling engine the operation of which is well known in the art. For use in a dchp system, the electrical output of the engine should be a single phase output of 16A.

The Stirling engine 1 is driven by a heat input from engine burner 2. This burner is fuelled by combustible gas supply 3 which is mixed with an air supply 4 under the control of a valve 5. The mixed stream is fed to the burner 2 by a fan 6. This drives the Stirling engine in a manner well known in the art to generate an electrical output 7 from a linear alternator. Heat is extracted from the Stirling engine at cooler 8 which is essentially a heat exchanger through which water is pumped by a pump 9 along line 10. The water passing through the cooler 8 is then further heated in a heat exchanger 11 by exhaust gas from the engine burner which has heated the head of the Stirling engine. In order to provide further heating of the water, and to provide a degree of independence to heat the water when the Stirling engine is not being operated, a supplementary burner 12 is provided to heat the water in the heat exchanger 11. The supplementary burner is fuelled by the combustible gas supply 3 which is mixed with an air supply 14 under the control of a valve 15. The mixed stream is fed to the supplementary burner 12 by the fan 6.

The fan 6 feeds air to mixer valves 5 and 15 through a diverter valve (not shown) which ensures the correct air flow to each mixer.

In an alternative design, separate fans have been used to feed air to the two gas/air mixer valves 5, 15. This removes the need for a diverter valve but, as described in our co-pending Application GB0130380.9, it does carry significant weight, cost and efficiency penalties over the single fan design.

Exhaust gases from the engine burner 2 and supplementary burner 12 which have given up their heat in the heat exchanger 11 then exit along flue 17. In this manner, the Stirling engine 1 produces an electrical output 7 and a heat output 18 which may be used, for example, to provide the domestic hot water requirement, or to feed a central heating system, or both of these in a combination arrangement ("combi" boiler).

Figure 2:
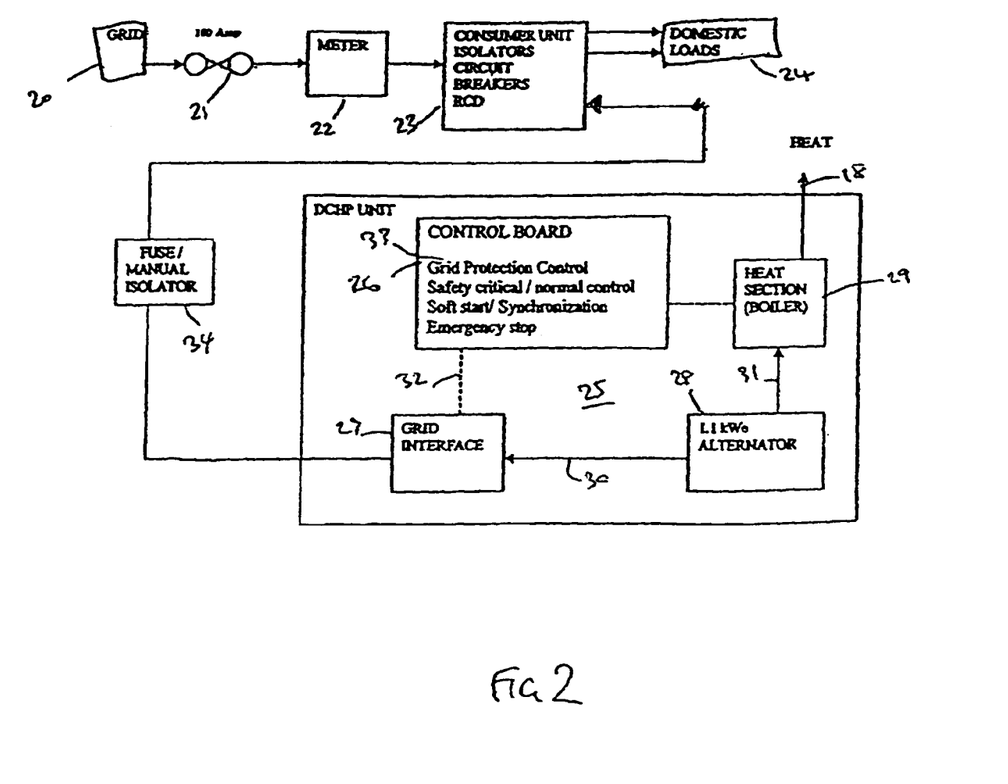
FIG. 2 is a schematic diagram of an existing power system.

The proposed dchp system is designed to provide up to 1 kW of electricity (net), feeding directly into the domestic network, and hence combining with the supply from the grid. FIG. 2 shows the simplest connection arrangement for the domestic circuit incorporating a dchp unit, connected in parallel with the grid supply.

In the arrangement in FIG. 2, the supply from the grid 20 enters the domestic dwelling via a grid fuse 21 and passes through the domestic meter 22 before passing through a standard consumer unit 23 containing components such as isolators, circuit breakers and RCD. From there, the power is fed to domestic loads 24.

A dchp unit 25 essentially comprises the Stirling arrangement of FIG. 1 as well as a control board 26 and grid interface 27. The alternator 28 is the alternator as described with reference to the Stirling engine 1 generating the electrical output 7, while the heat section 29 corresponds to the burners 2, 12 and heat exchanger 11 generating hot water output 18. As shown in FIG. 2, electrical output from the alternator 28 is supplied to the grid interface 27 along line 30 and the heat section 29 along line 31 to provide the essential power requirements for these components. In this arrangement the dchp unit will only generate when the grid supply is present, and it is not therefore a grid-independent system.

The grid interface 27 is described in detail in WO-A-01/69078. This is located within the dchp unit, and allows the unit to be connected and disconnected from the grid during normal "soft" starts and shut-downs of the Stirling engine (i.e. when the mains power supply is connected).

The control board sends the appropriate signals along line 32 to activate interface relays as appropriate, in addition to controlling the operation of the unit as a whole (controlling the fuel to the burners, etc.). Alternative grid interface technology can be used, such as an electronic variable auto transformer (variac), or a synchronous inverter instead of the relays.

The grid protection control 26 is as described in WO-A-02/061911 and monitors the grid supply 20. This is shown inside the dchp unit, but may also be located outside, or integral with the consumer unit or meter depending on the local arrangements. When the supply of electricity from the grid falls outside predetermined voltage and frequency limits, the grid protection control 26 signals the control board 33, which disconnects the unit from the grid at the grid interface. This disconnection is necessary in order to protect the generator, and the network itself, and satisfies legal requirements for any distributed power generation system. The current preset levels at which disconnection occurs are voltage: −10%, +10%, and frequency: −6%, +1% of the normal operating level.

The dchp system is connected into the domestic loads 24 via the consumer unit 23, and a supplementary fuse and manual isolator 34 are provided in the circuit to allow the safe installation and removal of the unit.

The system described above has been adapted according to the present invention in order to allow the generation of heat and electricity in the absence of mains power. In order to do this, various adaptations to the system are necessary as described below with reference to FIG. 3.

Figure 3:
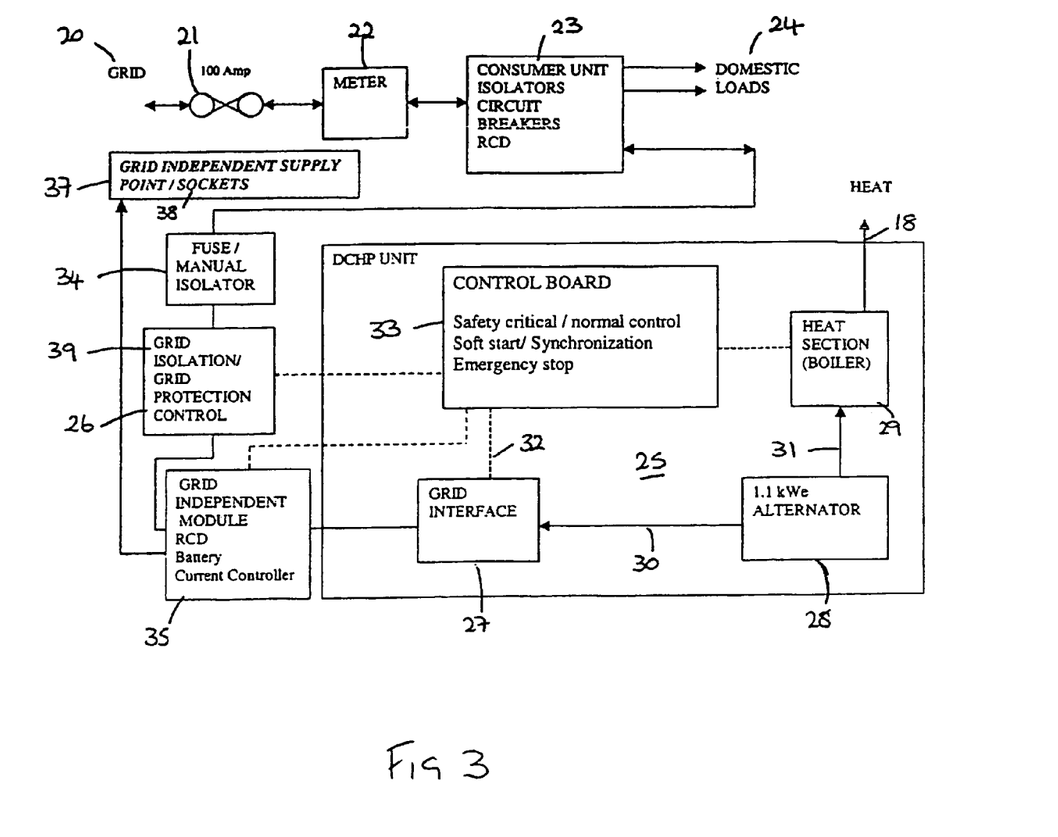
FIG. 3 is a schematic similar to FIG. 2 but showing a system according to the present invention.

In the arrangement shown in FIG. 3, the grid protection control 26 continues to operate once the mains supply has been disconnected to monitor a mains supply so that it can be reconnected as soon as it is back within the preset levels.

In addition to this, as shown in FIG. 3, a grid independent module 35 is provided as an engine start-up facility to allow the dchp unit 25 to restart when the grid supply is absent. This module 35 is described in greater detail below.

In the event of mains power failure, electrical power is supplied from the alternator 28 via the grid interface 27 and grid independent module 35 along line 36 to a grid independent supply point 37 or to sockets 38.

In the arrangement of FIG. 3, the grid independent supply point 37 is connected to a secondary circuit having equipment which is not normally connected to the main domestic circuit. This requires some duplication of equipment (emergency lighting, etc.) as the back-up circuit is a separate circuit, and would not be operational under normal grid-connected conditions.

This arrangement does, however, provide an emergency circuit to provide some utility to the user. The emergency circuit can provide power, up to the generator capacity, less the parasitic power required by the unit services (pumps, control circuitry, etc., which is typically around 10-20% of the generated power, and the installed back-up equipment must not exceed this level. A fuse is provided in the emergency circuit to enforce this limit, ensuring safety and protecting the system.

In the alternative arrangement, grid independent sockets 38 may be installed (which are actually a subset of the domestic loads 24, although they have, for convenience, been illustrated separately in FIG. 3). These sockets are normally powered by the grid supply, when present, and are powered by the dchp unit 25 when the mains fails.

In this arrangement, grid independent control is provided by the grid independent module 35 which can be integrated with the dchp unit control board 33. A number of standard electrical sockets are then available to supply equipment selected by the consumer. The duplication of equipment is avoided, as these sockets will be permanently live, whether the grid supply is present or not.

Figure 4:
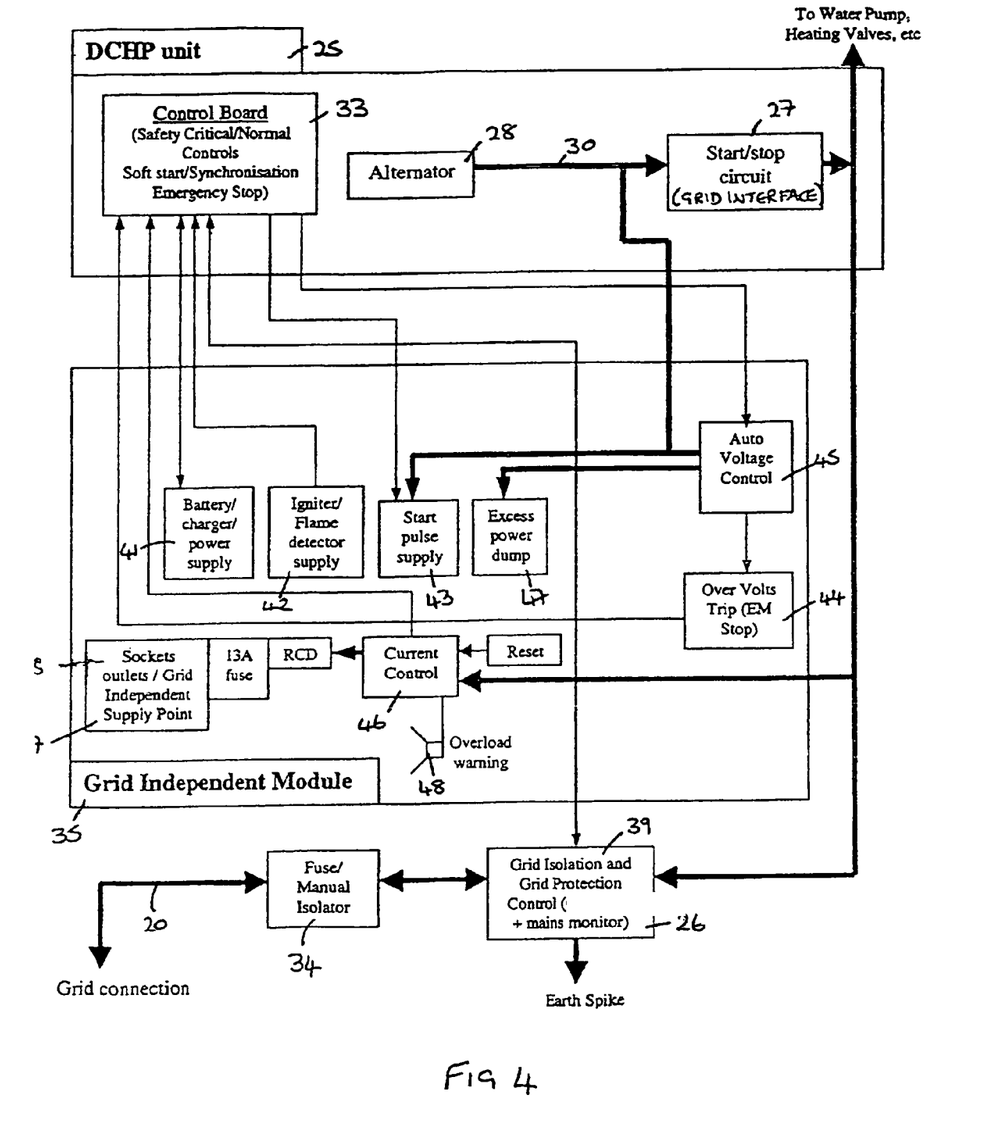
FIG. 4 is a schematic showing the operation of the grid independent module.

The grid independent module will now be described with reference to FIG. 4.

The grid independent module 35 provides the additional functionality required for the dchp unit to operate with no external mains supply. A battery, charger, or similar power supply 41 provides a limited capacity supply to allow restart under grid independent operation (see below). Power is fed from this supply to control circuitry, an igniter and flame detector 42, to allow the burner(s) to light, and also to start the pulse generator 43 to initiate reciprocation of the Stirling engine. Although shown as part of the Grid Independent Module in FIG. 5, the igniter and flame detector 42 could be part of the dchp unit control system instead.

Power from the alternator is fed through the grid independent module 35 via the grid interface 27. The alternator voltage is continuously monitored and maintained below a safe operational level by a voltage control system 45, which dumps excess power through the power dump 47 using wave control technology. This can be either an air-cooled or water-cooled resistor (as in an immersion heater). Excess voltage is therefore prevented with a time constant of a few milliseconds, protecting the Stirling engine from damaging over-voltage. Should the over-voltage become excessive due to, for example, component failures, an emergency cut-out is provided to shut down the engine.

The current control 46 uses impedance conversion wave control technology to control excessive power demand on the dchp system, when the current rises above a safe threshold. The current control 46 prevents stalling of the alternator by an excessive loading being applied during operation. This excessive load would occur if a user connected up too much load during grid independent operation.

Under normal operation the current control 46 allows the supplied current to rise in a controlled fashion as the peak voltage of the waveform is reduced to maintain an acceptable power output. This provides a safe over-current warning margin as described later. An additional over-current warning is provided in the form of a light or audible buzzer 48 located either on the exterior of the unit, or in a suitably visible location within the dwelling.

The current control is able to vary the current/voltage ratio (keeping the power constant) to provide the start up current demanded by certain domestic appliances (e.g. television, computer monitors, electrical motors).

The high current is only provided for a short period, following which, if the current is still high, the output is de-energized. The high current provided at low voltage also ensures that the system can rupture fuses when required.

An alternative arrangement incorporates an additional variable resistor installed in series with the domestic load circuit. This acts to increase the impedance of the load circuit, reducing the voltage.

The wave control technology used in both the automatic voltage control and the current control operates by drawing current from the input power stream and reconstituting the power to form an output waveform of the desired voltage level. The current delivered is then a function of the impedance of the driven device, this being the dump resistance in the case of the automatic voltage control and being the customer load impedance in the case of the current control. The main function of wave control is thus purposefully to vary output voltage amplitude using a pre-programmed control algorithm to give the two control functions of input voltage control or output current control.

The technology of wave control provides a high degree of control and manipulation of waveforms when compared with conventional inverter technology.

Engine Black-start Procedures

The control strategy for the dchp unit, generating only when in is economically favourable, demands that it will inevitably spend a proportion of its time with the Stirling engine shut down. The usual start-up procedure (soft-start) for the engine is to use a voltage pulse from the mains supply to initiate reciprocation. On some occasions, the engine may well be required to start up without the assistance of the grid supply.

For this purpose, the self-powered dchp unit includes a small battery (as described above) to allow this unassisted start. The battery is recharged from the unit's power output as soon as the dchp unit is generating. The battery is not actually providing the back-up power, and its size can therefore be kept to a minimum. A small rechargeable type of battery (such as those of the lead-acid, Nickel-Cadmium or Metal Nickel Halide variety) is currently preferred, but any rechargeable variety could be incorporated. Any other alternative variety of limited capacity power storage device, incorporating capacitors for example, could also be used. Due to its small size, this could be a service disposable item, of minimal cost. Other than this start-up power requirement, which is satisfied by the battery, the dchp unit has no external power requirement, and can operate fully independently indefinitely.

The start-up under mains-failed conditions is a 4-step procedure: (1) isolation of the domestic circuit (by grid isolation 39) to satisfy the network safety requirements; (2) firing up of the heater head burner 2; (3) when the recorded heater head temperature has reached, a target temperature, e.g. 220° C., the back-up battery provides a DC square wave voltage pulse to set the alternator in motion and hence initiate reciprocation of the engine; (4) power output increases to match the back-up electrical demand as the heater head temperature rises (max power output approx 1.1 kW at maximum operational heater head temperatures).

Over-Current Warning

If the power demand of the electrical equipment during loss of mains exceeds the capacity of the Stirling engine, damage to this may result. It is possible to limit the equipment connected to the independent circuit so that this is avoided. However, if unconnected sockets 38 are available to the consumer, control of the power demand is in the hands of the consumer. It is therefore important that some form of electrical over-current device is present in the back-up circuit to avoid overloading the Stirling engine.

This may be an instantaneous fuse/trip that acts to disconnect the supply as soon as the limit is exceeded (e.g. when an additional piece of equipment is plugged in). This would result in a complete power cut, and, where emergency equipment is involved, could be inconvenient. The awareness of the consumer to the power consumption of the individual pieces of equipment, although useful in this respect, cannot be relied upon to maintain the demand in the circuit below the cut-out threshold.

An alternative arrangement can therefore be provided where the consumer has a "high current" warning period. This is described below, and allows the current to rise above the nominal maximum by approximately 10%. During this over-current period the voltage will reduce proportionately to maintain the power within the limits of the generator. This will result in a minor deterioration in the performance of the installed equipment in the grid independent circuit. This deterioration will be noticeable to the consumer, and will therefore act as a warning that the limit is about to be exceeded. An over-current indicator is also present in the form of a light or audible buzzer 48. The allowed voltage deterioration will, however, be preset at such a level, so that it will not cause damage to equipment that may be sensitive to the input voltage (VCR mechanisms, medical pumps, etc.)

The functionality for providing this "high current" warning is provided by the current control 46 in FIG. 5. When an excessive current demand occurs, the current control 46 reduces the peak output voltage by using the impedance converter function to reduce the amplitude of the voltage waveform. Alternatively, a variable resistor installed in series with the domestic load circuit is controlled by the current control 46 to increase the impedance of the load. This reduces the voltage across the load in a controlled fashion, and allows the current to rise to satisfy the load, while the output power is maintained at a safe operational level.

Due to the loss of supply to the other domestic circuits, the consumer should be aware that the circuits are under grid independent conditions, and will be able to interpret the over-current effects, or other warnings, as a need to limit the equipment installed in the grid independent circuit. A failure by the consumer to act on the over-current indications will result in a full power cut when the ultimate limit is exceeded, and therefore an enforced reduction in the grid independent power demand. The power fed to the dchp unit services will continue, despite the disconnection of the rest of the grid independent circuit. The dwelling will not therefore be without heat, even when the power is cut. As soon as the demand is reduced (e.g. by unplugging equipment from the circuit) the cut-out will be reset and the supply to the grid-independent circuit will resume.

Grid Disconnection Due to Deteriorated Mains Power Quality

In addition to taking place when the mains supply fails, the disconnection from the grid will also occur when the mains supply falls outside the preset limits, due to supply difficulties eroding the quality of the supply. As a poor power quality could have detrimental effects on the domestic equipment it supplies, the dchp unit 25 can provide an alternative power supply to enable the consumer to protect sensitive equipment from any supply variations. The disconnection does not necessarily mean, therefore, that the mains supply has failed, just that it is not within the specified limits that denote a power supply of acceptable quality. In such a situation, electricity generated by the dchp unit will supply the grid independent circuit, and the mains will continue to supply the rest of the dwelling, until the mains supply is restored to acceptable quality levels.

Heat/Electrical Load Matching

When the dchp unit 25 is operating in parallel with a mains supply, the unit will export excess power generated to the grid, and operate to satisfy the domestic heat demand. As long as the heat demand is sufficient, the engine will generate at full capacity and the burners will be modulated to match the demand in the most economical way possible. There will be no need for electrical power to be dumped, as the grid will be used as a power sink, providing a passive form of voltage control. In this way the control for the mains-connected unit can be relatively simple. Alternatively, the demand for heat may be low while the electrical demand is high. When the grid is connected, the dchp unit can match the heat demand, while additional electrical power is imported from the grid to match the domestic requirement.

When the mains supply fails, the mode of dchp unit operation will be determined by the domestic power and heat demands. Where there is a demand for heat, the Stirling engine must be operating to generate sufficient power (approx. 200 W) to feed the unit services (control circuitry, pumps, etc.). Power in excess of this will be produced with the Stirling engine burner at its minimum output setting, so that the additional power will need to be dumped if there is no local demand for it. Where there is no connection to the grid, this power sink must be local to the dwelling.

Electrical Power Dumping Arrangements:

In order to allow the unit to operate where there is limited demand for the power generated, electrical power can be fed to a water-cooled resistor located in the cold water feed to the domestic hot water system. This acts as an immersion heater to convert the surplus electrical power to heat as in any conventional electrical water heating arrangement. When an immersion heater is already present in the dwelling, this could be used as an alternative/ additional heat dump. Alternatively, the grid independent module incorporates fan-cooled resistors to dissipate excess power.

Heat Dumping Arrangement:

As, without some demand for the waste heat, the Stirling engine cannot operate, a use for excess heat is required for grid independent operation. The thermal capacity of the domestic heating system radiators can provide a sink for the heat produced, but where radiators are turned off, and hot water is not required, the temperature of the water will gradually rise. The performance of the Stirling engine, which relies on a low cooler temperature, will then soon start to deteriorate. When system water temperature becomes excessive a supplementary air stream from the diverter valve can be used to provide additional air-cooling.

Grid Reconnection

When the grid protection control 26 detects the resumption of the mains supply, the unit is temporarily shut down. This shut down is necessary as the dchp unit will be operating at its natural frequency when it is disconnected from the grid supply. This will be marginally different to the normal grid frequency, and unsynchronised after the period of grid independent operation. A shut-down is performed followed by a restart after the reconnection has taken place at the grid isolation module 39. The normal grid starting procedure, using a voltage pulse from the grid supply to initiate reciprocation, can be followed for the restart, and the dchp unit can resume its operation in parallel with the grid.

Current statutory requirements mean that the grid supply cannot be reconnected until it has been monitored as within the preset limits for a period of three minutes. The Stirling engine is not therefore shut down until this condition has been satisfied. This will ensure that the grid independent circuit, which may be feeding essential domestic equipment is not inactive for any longer than is necessary to ensure a safe reconnection. The reconnection procedure, once the grid supply has been monitored as within the Grid Protection limits for three minutes, is then:

1. shut down Stirling engine burner;
2. disconnect dchp unit 25 from grid independent circuit at grid interface 27—grid independent circuit is inactive;
3. reconnect grid supply at grid isolation module 39—grid independent circuit is powered by mains supply;

4. wait until engine 1 has stopped, generally when heater head temperature has fallen to below 200° C., after around ten minutes;
5. reconnect dchp unit to grid at grid interface 27;
6. restart Stirling engine burner 2;
7. wait until heater head temperature is 220° C.;
8. send restart pulse to initialise reciprocation of the Stirling engine.

The shut down will not inconvenience the consumer as the main domestic circuits will once more be operational, and the grid independent circuit will only be without power instantaneously between steps 2 and 3 above. Where there is still demand for heat during this reconnection period, the supplementary burner 12 will continue to operate. The unit services receive power from part of the grid independent circuit, so the pumps, etc. will continue to function, powered by the reconnected mains power, and thereby preventing overheating within the heating system.

An alternative arrangement can be incorporated where a resistor-based grid interface circuit (as used for the grid interface 27), and described in WO-A-01/69078, is used to allow the grid supply to be reconnected without an engine shut down. This ensures that a smooth resynchronisation occurs in the grid independent circuit, utilizing the "make-before-break" relay contact arrangement of the grid interface circuit.

Another alternative arrangement would be to use a synchronizing circuit at the grid isolation point 39. This monitors and compares the voltage waveforms of the mains and the dchp supply. As soon as they are detected as synchronized a connection is made.

The invention claimed is:

1. A domestic power system to provide the heat and at least a portion of the electrical power requirements in a domestic dwelling, the domestic dwelling having a plurality of electricity consuming devices each of which have an electrical power requirement, the system comprising:
   a micro-cogeneration unit, operable both in the presence and absence of a main power supply, the micro-cogeneration unit comprising a combustible fuel supply, and arranged to produce an electrical power output and a heat output;
   a grid connector, for connecting the domestic power system to a main power supply;
   a detector, for detecting interruption of the main power supply; and
   a system controller arranged to connect the power output from the micro-cogeneration to all of the plurality of electricity consuming devices when the main power supply is present and to connect the power output from the micro-cogeneration to a selected subset of the plurality of electricity consuming devices having a lower electrical power demand than the total domestic power requirement, so as to provide electrical backup power thereto in the absence of main power, when the detector detects interruption of the main power supply.

2. A system according to claim 1, wherein:
   the micro-cogeneration unit comprises a Stirling engine and a start-up system;
   the Stirling engine including:
      a burner;
      an engine head;
      an alternator; and
      a reciprocating member; wherein the burner is arranged to input heat energy into the engine head so as to drive said reciprocating member; and further wherein the reciprocating member produces an electrical output via said alternator; and
   the start-up system including:
      a controller for controlling the start-up of the Stirling engine;
      an ignitor to ignite the burner;
      a pulse generator to supply an electrical pulse to the Stirling engine so as to set the reciprocating member in motion when the Stirling engine controller determines that the engine head has reached a threshold temperature; and
      a local limited supply of electrical power to power the Stirling engine controller, the ignitor and the pulse generator during the start-up operation.

3. The system of claim 1, further comprising a power output limiter arranged to limit the power output of the micro-cogeneration unit to a value equal to or less than a predetermined maximum available power output thereof, during the absence of a main power supply.

4. The system of claim 3, wherein the power output limiter is a voltage controller arranged, during the absence of a main power supply, to control the instantaneous peak voltage to a value less than a normal operating voltage, when the current to be drawn by a load exceeds the maximum current that could be drawn from the micro-cogeneration unit at the said normal operating voltage provided thereby.

5. A system according to claim 4, where the voltage controller is an impedance conversion wave controller.

6. The system of claim 4, further comprising a timer arranged to determine the amount of time over which the current to be drawn by the said load exceeds the said maximum current that could be drawn at the said normal operating RMS voltage, the power output of the micro-cogeneration unit being isolated from use by the said selected subset of the plurality of electricity consuming devices when the determined time exceeds a predetermined threshold.

7. A system according to claim 1, wherein the combustible fuel supply is a domestic gas supply.

8. A system according to claim 1, wherein the micro-cogeneration unit comprises a Stirling engine.

9. A system according to claim 8, wherein the Stirling engine is a linear free piston Stirling engine.

10. A system according to claim 1, wherein the selected subset of the plurality of electricity consuming devices is a subset of those supplied in the domestic dwelling, and wherein the system is provided with means to selectively disconnect those of the plurality of electricity consuming devices not forming a part of said subset thereof, in the absence of main power.

11. A system according to claim 1, wherein the detector for detecting interruption of the main power supply is also able to detect when the voltage or frequency of the main power supply are outside acceptable levels.

12. A system according to claim 1, further comprising an electrical sink to consume excess electricity.

13. A system according to claim 12, wherein the electrical sink is provided in the form of an air or water cooled resistor.

14. A system according to claim 1, further comprising a heat sink to consume excess heat.

15. A system according to claim 14, wherein the heat sink is a supplementary airstream which is able to dissipate heat output from the domestic combined heat and power unit.

16. A system according to claim 14, wherein the heat sink is a radiator of a domestic central heating system.

* * * * *